United States Patent
Brahm et al.

(10) Patent No.: US 6,936,678 B2
(45) Date of Patent: *Aug. 30, 2005

(54) PROCESS FOR PREPARING LOW-MONOMER-CONTENT TDI TRIMERS

(75) Inventors: Martin Brahm, Odenthal (DE); Joachim Simon, Düsseldorf (DE); Oswald Wilmes, Köln (DE); Jürgen Walloschek, Neunkirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/610,231

(22) Filed: Jun. 30, 2003

(65) Prior Publication Data

US 2004/0024213 A1 Feb. 5, 2004

(30) Foreign Application Priority Data

Jul. 3, 2002 (DE) ......................... 102 29 780

(51) Int. Cl.$^7$ ............................. C08G 18/18
(52) U.S. Cl. .................. 528/53; 528/73; 544/192; 544/193; 544/222
(58) Field of Search .................. 528/53, 73; 544/192, 544/193, 222

(56) References Cited

U.S. PATENT DOCUMENTS

| | | | |
|---|---|---|---|
| 2,993,870 A | 7/1961 | Burkus | 260/2.5 |
| 3,384,624 A | 5/1968 | Heiss | 260/77.5 |
| 3,996,223 A | 12/1976 | Gupta et al. | 260/248 NS |
| 4,115,373 A | 9/1978 | Henes et al. | |
| 5,064,960 A | 11/1991 | Pedain et al. | 544/222 |
| 5,606,004 A | 2/1997 | Brahm et al. | 528/73 |
| 5,723,564 A | 3/1998 | Schmalstieg et al. | 528/73 |

FOREIGN PATENT DOCUMENTS

| | | |
|---|---|---|
| CA | 2204084 | 11/1997 |
| DE | 1 201 992 | 9/1965 |
| DE | 34 20 923 | 12/1985 |
| FR | 2 301 585 | 11/1978 |
| GB | 1 458 564 | 12/1976 |
| JP | 56-59828 | 5/1981 |
| JP | 63-260915 | 10/1988 |

OTHER PUBLICATIONS

Houben–Weyl, Methoden der organischen Chemie, vol. 8, (month unavailable) 1952, Georg Thieme Verlag Stuttgart, pp. 136–137, S. Petersen: "Monomere Kohlensaurederivate".

H. F. Sarx Lackustharze, 5$^{th}$ edition, Carl Theime Verlag Munich, (month unavailable) 1971, pp. 153–179, Dr. Ernst Schneider, "Polyadditionsharze".

J. prakt. Chem., 336, (month available) 1994, pp. 185–200, Hans Josef Lass, Reinhard Halpaap und Josef Pedain, "Zur Synthese aliphatischer Polyisocyanate–Lackpolyisocyanate mit Biuret–, Isocyanurat–oder Uretdionstruktur".

Primary Examiner—Rachel Gorr
(74) Attorney, Agent, or Firm—Joseph C. Gil; Aron Preis; Thomas W. Roy

(57) ABSTRACT

The invention relates to a novel process for preparing low-monomer-content trimers based on 2,4- and 2,6-diisocyanatotoluene (TDI) and to the use thereof in coatings. The trimers are produced from a mixture of from 20 to 80% by weight of diisocyanate component containing at least 80% by weight of 2,4- and/or 2,6-diisocyanatotoluene and from 20 to 80% by weight of solvents and/or diluents and also phenolic catalysts containing dialkylaminomethyl groups.

5 Claims, No Drawings

PROCESS FOR PREPARING LOW-MONOMER-CONTENT TDI TRIMERS

CROSS REFERENCE TO RELATED PATENT APPLICATION

The present application claims the right of priority under 35 U.S.C. § 119 (a)–(d) of German Patent Application 10229780.0 filed Jul. 3, 2002.

FIELD OF THE INVENTION

The invention relates to a novel process for preparing low-monomer-content trimers based on 2,4- and 2,6-diisocyanatotoluene (TDI) and to the use thereof in coatings.

BACKGROUND OF THE INVENTION

The preparation of polyisocyanates containing isocyanurate groups has been known for a long time and is described in a large number of publications and patents (Houben-Weyl, Methoden der organischen Chemie Volume 8, p. 136 ff., Georg Thieme verlag Stuttgart 1952; H. Wagner, H. F. Sarx, Lackkunstharze 5th Edition, page 153 ff., Carl Hanser Verlag Munich 1971; DE-A 4 428 107, U.S. Pat. No. 2,993,870; DE-C 1 201 992; DE-A 2 452 532; J. prakt. Chem. 336, pp. 185 to 200, 1994). Both trimers based on aliphatic and trimers based on aromatic diisocyanates are employed universally as paint base materials and also as polyurethane elastomers and polyurethane foams.

From an occupational hygiene standpoint low-monomer-content trimer product grades are preferred. These products are prepared either by distillative separation of the excess monomer after the trimerization reaction or by stirring the trimerization reaction toward high conversions, until the monomer has very largely undergone conversion to higher-oligomer isocyanurates. The latter method is particularly successful when the diisocyanates used carry two isocyanate groups which differ in their reactivity, as in the case of 2,4-toluene diisocyanate. Solvent-containing products of this kind can be prepared in this way with a monomeric TDI (sum of the isomeric toluene diisocyanates) content of <0.5% (e.g. ®Desmodur IL, commercial product of Bayer AG, 50% in butyl acetate, NCO content: 8.0%).

As a result of the tightening in the labelling of TDI-based products, interest in substantially monomer-free grades, i.e. products having TDI contents of <0.1%, has come sharply to the fore. In order to achieve this aim, the starting base materials of TDI-based coating systems ought to contain substantially <0.5% by weight TDI, preferably <0.1% by weight.

In principle, this objective can be achieved simply by continuing trimerization to even higher conversions and thus even higher molecular weights. However, this increases the viscosity, and on the other hand this leads to products having fewer and fewer reactive isocyanate centres. Furthermore, to an increasing extent, compatibility in the case of blending with other paint base materials is unfavorably influenced in this way.

There has also been no lack of attempts to reduce the monomer content in other ways. The use of non-solvents for trimers in order to shift the equilibrium are described in, for example, JP-A 56059828. Distillation processes for "thin-filmed TDI trimers" (e.g. DE-A 3 420 923, DE-A 19 618 230) and processes which employ a pretreatment or after-treatment stage, such as subsequent urethanization, for example, are described in the literature (DE-A 3 928 503, U.S. Pat. No. 3,384,624, DE-A 2 414 413, DE-A 19 523 657,). Even particularly gentle processes for selective trimerization at low temperatures are discussed (JP-A 63 260 915). All of the methods described, however, lead to very complex, often multistage, industrial processes, are associated with very long reaction times and hence a poor .space/time yield, and/or cannot be transferred from the laboratory stage to the industrial scale. EP-A 0 416 338 describes a catalytic trimerization of TDI in paint solvents using, inter alia, Mannich bases. The addition of alcohols, which is described here as being essential and necessary, leads, however, to the formation of urethane groups, which exert a strong co-catalytic influence on the trimerization reaction and so destroy the selectivity that is necessary for achieving low TDI contents. In analogy to this, combinations of alcohol sand other catalyst systems are described (e.g. U.S. Pat. No. 5,905,151). It was, however, not possible to obtain products whose monomer content was <0.1%.

DE-A 2 452 532 describes, inter alia, likewise the trimerization of TDI using Mannich bases. Essential to the invention in this case is the addition of carbamic esters, leading at high temperatures to the deactivation of the catalyst system and so preventing "runaway" of the reaction. However, only products with high monomer content are obtained, with no substantially monomer-free TDI trimer grades.

BRIEF SUMMARY OF THE INVENTION

It is an object of the present invention, therefore, to provide a simple process for preparing substantially monomer-free TDI trimer solutions without additional process steps or a physical separation of monomeric TDI.

This object has been achieved with the process of the invention, described in more detail below.

The invention provides a process for preparing solvent-containing and/or diluent-containing polyisocyanates based on 2,4- and/or 2,6-diisocyanatotoluene which contain isocyanurate groups and <0.1% by weight of monomeric diisocyanate characterized in that in a mixture of A) from 20 to 80% by weight of diisocyanate component containing at least 80% by weight of 2,4- and/or 2,6-diisocyanatotoluene and
B) from 20 to 80% by weight of solvents and/or diluents and also
C) phenolic catalysts containing dialkylaminomethyl groups, at a temperature from 55 to 120° C. in the absence of aliphatic hydroxyl groups and urethane groups a catalytic trimerization reaction is carried out and subsequently, where appropriate by stopping with catalyst poisons, the reaction is ended.

The process of the invention is used to prepare polyisocyanate solutions containing isocyanurate groups and preferably <0.10% of free TDI, more preferably <0.05% of free TDI.

DETAILED DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

As diisocyanate component A) use is made in accordance with the invention of 2,4-diisocyanatotoluene and/or 2,6-diisocyanatotoluene, optionally containing up to 20% by weight, preferably up to 10% by weight, of other compounds containing isocyanate groups. They can be used alone or in a mixture with one another.

Mixtures of 2,4- and 2,6-diisocyanatotoluene as diisocyanate component A) are used preferably in a weight ratio of from 3:2 to 9:1.

2,4- and/or 2,6-diisocyanatotoluene, as isocyanate component A) may where appropriate also include monoisocyanates having aliphatically, cycloaliphatically, araliphatically or aromatically attached isocyanate groups such as, for example, stearyl isocyanate, naphthyl isocyanate, diisocyanates having aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diiso-cyanate, IPDI), 4,4'-diisocyanatodicyclohexylmethane, 1-isocyanato-1-methyl-4(3)-isocyanatomethylcyclohexane (IMCI), bis(isocyanatomethyl)norbornane, 2,4'- and 4,4'-diisocyanatodiphenylmethane and higher homologues, 1,5-diisocyanatonaphthalene, dipropylene glycol diisocyanate, triisocyanates and/or isocyanates of higher functionality, such as, for example, 4-isocyanatomethyl-1,8-octane diisocyanate (nonane triisocyanate), 1,6,11-undecane triisocyanate or any desired mixtures of such isocyanate compounds and what are known as modified isocyanate compounds, which derive from the abovementioned diisocyanates and triisocyanates, and are prepared by oligomerization reactions such as trimerization, for example.

It is preferred to use a mixture of 2,4-and 2,6-toluene diisocyanate.

As solvents B) it is possible to use diluents and solvents commonplace in polyurethane chemistry, such as, for example, .toluene, xylene, cyclohexane, chlorobenzene, butyl acetate, ethyl acetate, ethylglycol acetate, pentyl acetate, hexyl acetate, methoxypropyl acetate, tetrahydrofuran, dioxane, acetone, N-methylpyrrolidone, methyl ethyl ketone, white spirit, aromatics with higher degrees of substitution, such as those sold under the name Solvent Naphtha®, Solvesso®, Shellsol®, Isopar®, Nappar® and Diasol®, heavy benzene, tetralin, decalin and alkanes having more than 6carbon atoms, customary plasticizers, such as phthalates, sulfonates and phosphates, and also mixtures of such solvents and diluents. The concentration of the diluent and solvent here is set at from 20 to 80% by weight, preferably from 40 to 60% by weight.

Of further suitability as solvents B) are also polyisocyanates based on aliphatic diisocyanates as described, for example, in DE-A 4 428 107. By this means it is possible to obtain dilute, low-monomer-content TDI trimers which contain no readily evaporable solvents or diluents.

Suitable phenolic catalysts C) for initiating and accelerating the trimerization reaction include special systems having a so-called negative temperature effect which lead to selective incorporation of TDI even at relatively high temperatures. Catalyst systems- of this kind have phenolic OH groups and N,N-dialkylamino-methyl groups, attached to aromatics (alkyl: independently alkyl chain or alkylene chain having up to 18 carbon atoms which may be separated by oxygen or sulphur). These groups may be distributed over two or more molecules or may be sited on one or more benzolic aromatics. As catalyst systems it is preferred to use compounds which contain both hydroxyl groups and dialkylaminomethyl groups in one molecule. Particular preference is given to using systems whose dialkyl-aminomethyl groups (alkyl=$C_1$ to $C_3$ chain) are positioned ortho to aromatic hydroxyl groups. Examples that may be mentioned include the following Mannich bases, as obtained, for example, on the basis of phenol, p-isononylphenol or bisphenol A, for example, by reaction of 188 parts by weight of phenol with 720 parts of a 25% strength aqueous dimethylamine solution and 425 parts by weight of 40% strength formaldehyde solution by heating at 80° C. for two hours, separating off the aqueous phases and distilling the organic phase at 90° C./10 torr in accordance with DE-A -2 452 531 9.

The trimerization reaction of the invention is performed at the high temperatures of 55 to 120° C. that are unusual for the trimerization of aromatic isocyanates, preferably 70 to 110° C. and more preferably 75 to 90° C.

The trimerization reaction of the invention is conducted in the absence of alcohol with aliphatic hydroxyl groups and any urethane groups formed therefrom, in order to achieve an advantageous increase in selectivity at high temperature.

The catalysts C) are employed as pure substances or in solution, where appropriate in two or more small portions. For the preparation overall use is made of 0.003 to 2.0% by weight, preferably from 0.01 to 0.5% by weight, of active catalyst. The reaction time is generally between 1 and 100 hours, preferably 10 and 25 hours.

The trimerization reaction is preferably stopped at the end by adding a catalyst poison such as protic acids, acid chlorides or methylating compounds, such as methyl toluenesulfonate, for example Surprisingly in the case of the process of the invention the use of the specified catalysts C) in connection with the trimerization of TDI in the temperature range according to the invention an effect known contrary the general teaching is observed which leads at relatively high temperature to a more selective incorporation of monomer. With the process according to the invention it is possible surprisingly to prepare substantially monomer-free TDI trimer solutions even when using 2,6-TDI.

Moreover, after the end of the trimerization reaction, the reaction product may be modified further with low molecular mass and/or polymeric hydroxyl-containing compounds.

The polyisocyanates prepared by the process of the invention are preferably used to prepare coating materials which can be cured under the influence of atmospheric moisture. They may likewise find use in or for producing adhesion promoters, adhesives, printing inks, sealants and polyurethane molding, and may be added to formulations to produce these products, as well as to produce paints and coatings. With more preference they are used as crosslinkers in 2-component systems with isocyanate-reactive compounds that are known per se. These include, for example, hydroxy-functional polyethers, polyesters, polyamides, polycarbonates, polyacrylates, polybutadienes, and hybrid forms of the hydroxy-functional polymers stated. Low molecular mass diols and polyols, dimer fatty alcohols and trimer fatty alcohols, and amino-functional compounds can also find use in 2K (two-component) systems. With blocked isocyanate-reactive compounds it is also possible to formulate one-component systems; similarly, the products produced by the process of the invention may also be used in blocked form in coating materials. In this case drying takes place at relatively high temperatures up to about 200° C.

Besides the process products of the invention, other auxiliaries and additives may be used in the coatings as well, such as, for example, the customary wetting agents, levelling agents, anti-skinning agents, anti-foam agents, solvents, matting agents such as silica, aluminium silicates and high-boiling waxes, viscosity regulators, pigments, dyes, UV absorbers, and stabilizers against thermal and oxidative degradation.

The coating materials obtained may be used to coat any desired substrates such as, for example, wood, plastics, leather, paper, textiles, glass, ceramic, plaster, masonry, metals or concrete. They can be applied by customary application methods such as spraying, brushing, flooding, pouring, dipping and rolling. The coating materials may be used in the form of clearcoat materials and also in the form of pigmented paints.

The coatings produced from the products of the invention cure at 20° C. generally over a period of a few minutes to hours to form high-quality coatings. Alternatively, curing can be effected at lower temperatures (to −5° C.) or in accelerated form at higher temperatures up to 200° C.

EXAMPLES

All figures given as "parts" and "%" are by weight. NCO contents were determined, as known to the skilled worker, by titration.

Comparative Example 1
(not inventive, extensive reworking of Example 1 from EP-A 0 416 338)

In a stirred apparatus, 375 g of Desmodur® T80 (mixture of 80% 2,4-diiso-cyanatotoluene and 20% 2,6-diisocyanatotoluene) at 50° C. were admixed with 19.8 g of 2-ethylhexanol and stirred until the mixture had an NCO content of 44%. It was then diluted with 394 g of butyl acetate, admixed with 1.0 g of catalyst solution (40% strength xylene solution of the Mannich base based on phenol/dimethylamine) and stirred. After 3,8 and 12 hours, 0.7 g in each case of catalyst solution was added for further catalysis, and the mixture was stirred at 50° C. or 10 hours until the NCO content had fallen to8.05. To end the trimerization reaction the resultant product was admixed with 1.0 g of methyl toluenesulfonate and heated at 80° C. for one hour. The product had the following characteristics:

| NCO content: | 7.95% |
|---|---|
| Solids content: | 50% |
| Viscosity at 23° C.: | 1250 mPas |
| free TDI content: | 0.35% (determined by means of GC) |

Example 1
(Process According to the Invention)

In a stirred apparatus, 500 g of butyl acetate and 500 g of 2,4-diisocyanatotoluene at 75° C. were admixed with 1.5 g of catalyst solution (dilution (40% in butyl acetate) of a 40% strength solution of a Mannich base based on bisphenol A/dimethylamine in xylene) and stirred. After 4, 8 and 12 hours, secondary catalysis was carried out with half the amount and the mixture was stirred at 75° C. for 10 hours more until the NCO content had fallen to 8.1%. To end the trimerization reaction the resultant product was admixed with 1.5 times the amount by weight (based on added catalyst amount) of methyl toluenesulfonate and heated at 80° C. for one hour. The product had the following characteristics:

| NCO content: | 8.07% |
|---|---|
| Solids content: | 50% |
| Viscosity at 23° C.: | 1300 mPas |
| free TDI content: | <0.03% (determined by means of GC) |

Example 2
(Process According to the Invention)

In a stirred apparatus, 500 g of butyl acetate and 500 g (1.35 eq) of Desmodur® T80 (80% 2,4-diisocyanatotoluene and 20% 2,6-diisocyanatotoluene) at 80° C. were admixed with 1.34 g of catalyst (dilution (40% in butyl acetate) of a 40% strength solution of a Mannich base based on bisphenol A/dimethylamine in xylene) and stirred. After 3, 8, 10 and 14 hours, 30% of the initial amount of catalyst was added and the mixture was stirred at 80° C. for a further 6 hours until the NCO content had fallen to 8.05%. To end the trimerizalion reaction the resultant product was admixed with 1.5 times the amount by weight (based on added catalyst amount) of methyl toluenesulfonate and heated at 80° C. for one hour. The product had the following characteristics:

| NCO content: | 8.02% |
|---|---|
| Solids content: | 50% |
| Viscosity at 23° C.: | 1250 mPas |
| free TDI content: | 0.04% (determined by means of GC) |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. Process for preparing solvent-containing and/or diluent-containing polyisocyanates based on 2,4- and/or 2,6-diisocyanato-toluene which contain isocyanurate groups and <0.1% by weight of monomeric disocyanate comprising
a) carrying out a catalytic trimerization of a diisocyanate component in the presence of a solvent component and a catalyst component; combined to form a mixture,
wherein the mixture comprises from 20 to 80% by weight diisocyanate component,
wherein the dilsocyanate component contains a mixture of 2,4-diisocyanatotoluene and 2,6-diisocyanatotoluen at a weight ratio of from 3:2 to 9:1,
wherein the mixture comprises from 20 to 80% by weight of solvents and/or diluents,
wherein the mixture comprises phenolic catalysts contaning dialkylaminomethyl groups, and
wherein the catalytic trimerization is carried out at a temperature from 70°C. and 120°C. in the absence of aliphatic hydroxyl groups and urethane groups, and
b) ending the reaction subsequently, by stopping with catalyst poisons.
2. Process according to claim 1, wherein catalysts are used whose dilialkylaminomethyl groups (alkyl=$C_1$ to $C_3$ chain) and phenolic OH groups are positioned in one molecule.

3. Process according to claim 1, wherein catalysts are used which are obtained as Mannich bases based upon phenol, p-isononylphenol or bisphenol A by reaction with dimethylamine end formaldehyde.

4. Process for preparing solvent-containing and/or diluent-containing polyisoyanates based on 2,4-diisocyanatotoluene which contain isocyanurate groups and <0.1% by weight of monomeric diisocyanate comprising a) cariying out a catalytic trimerization of a diisocyanate component in the presence of a solvent component and a catalyst component; combined to form a mixture, wherein the mixture comprises from 20 to 80% by weight diisocyanate component, wherein 2,4-diisocyanatotoluene is used as starting diisocyanate, wherein the mixture comprises from 20 to 80% by weight of solvents and/or diluents, wherein the mixture comprises phenolic catalysts containing dialkylaminomethyl groups, and wherein the catalytic trimerizatlon is carried out at a temperature from 70 C. and 120 C. in the absence of aliphatic hydroxyl groups and urethane groups, and ending the reaction subsequently, by stopping with catalyst poisons.

5. Method for preparing polyurethane paints, coatings, adhesives, printing inks, sealants and polyurethane moldings, comprising adding polyisocyanates containing isocyanate groups made according to the process of claim 1 to a formulation.

* * * * *